(No Model.)

C. H. JOHNSON.
MOTOR TRUCK GEARING.

No. 566,400. Patented Aug. 25, 1896.

Witnesses
E. E. Sparks.
J. Landsing.

Inventor
Charles H. Johnson.
By Attorneys
Buckingham & Evarts

UNITED STATES PATENT OFFICE.

CHARLES H. JOHNSON, OF YOUNGSTOWN, OHIO, ASSIGNOR, BY MESNE ASSIGNMENTS, TO THE GENERAL ELECTRIC COMPANY, OF NEW YORK.

MOTOR-TRUCK GEARING.

SPECIFICATION forming part of Letters Patent No. 566,400, dated August 25, 1896.

Application filed December 24, 1892. Serial No. 456,215. (No model.)

*To all whom it may concern:*

Be it known that I, CHARLES H. JOHNSON, a citizen of the United States, residing at Youngstown, in the county of Mahoning and State of Ohio, have invented a new and useful Improvement in Motor-Truck Gearing, of which the following is a specification.

My invention relates to the use of a nonmetallic fibrous or wood-toothed sprocket for use in connection with power-transmitting chain for trucks of vehicles; and it consists in the form and means of support or fastening of such teeth and means of support and coupling of the devices used in connection therewith. These objects are attained by devices shown in the accompanying drawings, in which—

Figure 1:
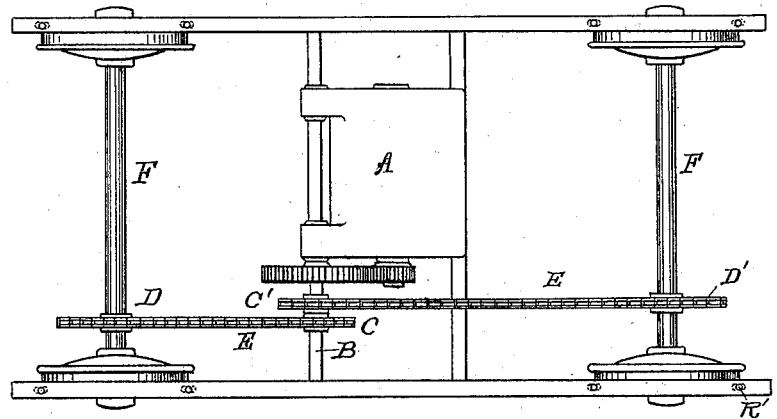
Figure 2:
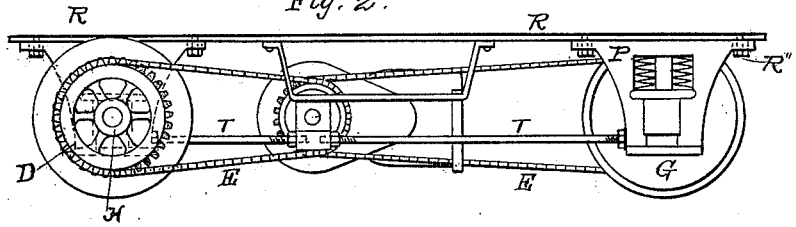
Figure 3:
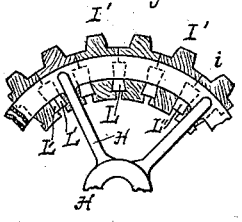
Figure 4:
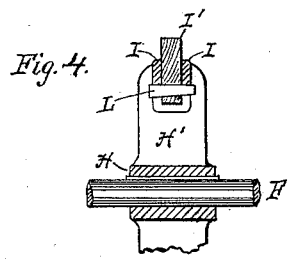

Figure 1 shows a plan view of truck with the sprockets in place. Fig. 2 shows side elevation of same. Fig. 3 shows a portion of a sprocket-wheel on a large scale. Fig. 4 is a sectional view of Fig. 3.

Like parts are indicated by the same letters of reference throughout.

It will readily be understood that the periphery of a drive-wheel traveling even at moderate speed makes between one thousand and fifteen hundred feet per minute. It is also known that if a chain is worked much beyond three hundred feet per minute in its concussive action against the sprocket the chain tends to beat and crystallize itself into disintegration, attending which is a rattle and noise so great as to be very objectionable. It will readily be seen that excessive chain travel is necessary, especially when the ratios of diameter of driver and sprocket are such as to distribute the strains advantageously.

The noise above referred to, though incidental and seemingly trifling in effect, has rendered the use of this form of power-transmission for moving vehicles highly objectionable, so much so in fact that it has never found its way into general use, although possessing many and recognized advantages. It is furthermore recognized that the elements of the sprocket being called into action more frequently than the elements of the chain they are subjected to greater wear, and it is desirable, therefore, to have the wearing-faces easily and quickly removable and the wear come on the inexpensive replaceable part. I have also found it to be a fact that for the best result the chain should run taut, and owing to the wear that the shafts of the truck should be adjustable as to centers.

The motor A, through suitable gearing, drives the shaft B, upon which are located the sprockets C and C', connected to the sprockets D and D' by chains E, by means of which the axles F F receive their power from the motor A and are connected and driven at like speed. Upon these axles are the usual traction-wheels G, as shown. The sprockets consist of a hub H, arms H', and rim I. This rim preferably consists of two plates, as shown in Fig. 4 at I I.

I provide each tooth with a tenon, as shown in Fig. 4, fitting between the plates I and long enough to project through between them into the space between the arms H', each tenon having in one or both edges a recess preferably dovetailed to receive a wedge L. The wedge may be large enough to engage with the recesses in two adjacent tenons, or two wedges side by side may be used to fill this space, as at L', or the recess may be on one side only of the tenon, the wedge L" bearing against the straight side of the adjacent tenon. These wedges or keys extend across under the inner edges of both plates I, with which they engage to hold the teeth in place. However the wedges are arranged, they serve not only as holding devices, but also as tightening devices, since they tend to draw the teeth inward radially and so compress them all closely and solidly together.

In Fig. 3 it will be noticed that the sprocket is differentiated from a mortise-gear by the presence of a circumferential enlargement (indicated by $i$) extending from the radial projection or tooth of the fibrous wearing-face of the sprocket, so as to entirely fill the space between such teeth, providing a bearing-surface for the cylindrical portion of the chain as it rests between the teeth. It will readily be understood that two or more of these teeth may be formed of a single piece and so constitute a section of the rim or wearing-face.

The pedestals P are removably attached to the truck-rail R, as shown by slots R', in which are the bolts R". The compression strains between the journals are taken up by the adjustable rods T T, so that as the sprocket and chain near the pedestal P is allowed to slip along under the rail R until the wear has amounted to one or two links of the chain, which are then removed to bring the pedestal again nearer the shaft B.

The use and operation of these devices will readily be understood from the foregoing.

The removable wearing-face consists of sections of wood, which are secured to the rim by any suitable means. As will readily be understood, the teeth may consist of wood, vulcanized fiber, leatheroid, rawhide, or any of the well-known materials of this class.

It is found in the use of this device that the noise is almost entirely eliminated in its operation, even at a high speed, and the cost for renewals of the teeth, when made of inexpensive substance like wood, is a very insignificant factor in its operation, inasmuch as they may be made by machinery and thereby extremely inexpensive.

Another great advantage has been noted in the fact that the driving-chain when used on a vehicle without these fibrous teeth will soon crystallize and break, whereas by their use the chain will wear until literally worn out before breakage takes place, showing the elimination of the molecular vibration produced by concussion to be a feature of great value.

It will be noticed in Fig. 3 that the rim comes up upon either side of the enlarged portion of the tooth, giving the tooth at this point large body even with a small actual protrusion from the wheel.

Having thus described my invention, what I claim as new, and desire to secure by Letters Patent, is—

1. The combination with a truck-frame, of a motor attached to said frame, a motor-driven shaft journaled in fixed bearings on said frame, two sets of pedestals adjustably secured to said frame, wheeled axles journaled in said pedestals, sprocket-wheels on the axles and on the motor-driven shaft, sprocket-chains connecting the axle-sprockets with the driving-sprockets, rods extending from the pedestals to the bearings of the driving-shaft, and means for adjusting the length of said rods, substantially as described.

2. The combination with a motor-truck, of a motor, a driving-shaft actuated thereby, wheeled axles journaled in suitable bearings on the truck, and sprocket-chain driving-gear between the shaft and the axles comprising sprockets, each composed of a hub, arms thereon, a rim carried by said arms and composed of two parallel plates, fibrous teeth lying wholly between the planes of the inner surfaces of said plates having tenons filling the space between said plates, and projecting within the inner edge thereof and provided with recesses in their edges, and wedges fitting said recesses and extending across and in engagement with the inner edges of said plates, each wedge engaging with two tenons and serving both to hold the teeth in place and draw them inward to compress them solidly together, substantially as described.

CHARLES H. JOHNSON.

Witnesses:
ALLEN HELLAWELL,
GEO. SWANSTON.